(12) United States Patent
Zhang

(10) Patent No.: US 8,737,234 B2
(45) Date of Patent: May 27, 2014

(54) METHOD FOR ADMINISTRATING OPTICAL ACCESS NODES AND OPTICAL ACCESS NODE THEREOF

(75) Inventor: Dezhi Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 240 days.

(21) Appl. No.: 13/258,044

(22) PCT Filed: Jun. 4, 2010

(86) PCT No.: PCT/CN2010/073567
§ 371 (c)(1),
(2), (4) Date: Jan. 18, 2012

(87) PCT Pub. No.: WO2011/020361
PCT Pub. Date: Feb. 24, 2011

(65) Prior Publication Data
US 2012/0128356 A1 May 24, 2012

(30) Foreign Application Priority Data
Aug. 20, 2009 (CN) .......................... 2009 1 0167123

(51) Int. Cl.
*H04L 12/00* (2006.01)
(52) U.S. Cl.
USPC ....................................................... 370/241
(58) Field of Classification Search
None
See application file for complete search history.

(56) References Cited

U.S. PATENT DOCUMENTS

2007/0263535 A1\* 11/2007 Shabtay ........................ 370/230
2009/0154471 A1 6/2009 Kim et al.
2010/0239247 A1\* 9/2010 Kani et al. ..................... 398/41

FOREIGN PATENT DOCUMENTS

| CN | 1852218 A | 10/2006 |
|---|---|---|
| CN | 101043352 A | 9/2007 |
| CN | 101184023 A | 5/2008 |
| CN | 101453673 A | 6/2009 |
| JP | 2007142529 | 7/2007 |
| WO | 2007077923 A1 | 7/2007 |
| WO | 2007119635 A1 | 10/2007 |

OTHER PUBLICATIONS

English Abstract of JP2007142529 (Published Jul. 6, 2007).

\* cited by examiner

*Primary Examiner* — John Blanton
(74) *Attorney, Agent, or Firm* — McClure, Qualey & Rodack, LLP

(57) ABSTRACT

A method for administrating an optical access node is disclosed, the method comprises: one or more administration terminal nodes are established in the optical access node, and constitute an internal Operation, Administration and Maintenance (OAM) domain in said administration terminal node; sends the Ethernet Operation, Administration and Maintenance message between the administration terminal nodes, and according to the attribute sof the Virtual Local Area Network (VLAN) of the user, said Operation, Administration and Maintenance message carries the Virtual Local Area Network identifier which corresponds to the attribute of the virtual local area network of the user. The present invention also provides an optical access node. The present invention not only provides a mechanism for diagnosing the faults in the Ethernet level between the OLT and the ONU within the optical access node, but also can break through the limitation that the conventional Ethernet OAM frame format is unitary and unfit for the TR101 VLAN service model, and the service operation is not affected when using the method of the present operation, thus to help the operator to address the Ethernet maintenance requirements of the optical access nodes under the TR101 VLAN structure.

18 Claims, 1 Drawing Sheet

METHOD FOR ADMINISTRATING OPTICAL ACCESS NODES AND OPTICAL ACCESS NODE THEREOF

CROSS REFERENCE RELATED APPLICATIONS

This application is a national phase of PCT/CN2010/073567 filed Jun. 4, 2010, which claims priority to China Application Serial No. 200910167123.3, filed Aug. 20, 2009, both of which are entirely incorporated herein by reference.

TECHNICAL FIELD

The present invention relates to a field of optical communication, and more particularly, to an administration method used in the Passive Optical Network (PON) system when constructing an optical access node between an Optical Line Terminal (OLT) and an Optical Network Unit (ONU).

BACKGROUND OF THE RELATED ART

In the $7^{th}$ chapter, namely Operation, Administration and Maintenance (OAM), of the Broadband Forum (BBF) standard TR101, a method for maintaining the access network based on the Ethernet is defined. In the definition of the chapter, based on the method of the IEEE Standard 802.1ag, four layers of administration domains, respectively Customer, Carrier, Intra-Carrier and Access Link, are defined in combination with the actual condition of the access network. In each domain, the Maintenance End Point (MEP) function is implemented between the two end points, and the Maintenance Intermediate Point (MIP) function is implemented in the middle of the link. Between the MEP node and the MIP node, the Ethernet OAM message is sent, forwarded and replied to help localize the specific area of the Ethernet breakdown.

The main function of the 4 administration domains defined in the standard is providing the operator with an end-to-end method at the Ethernet level, to help the operator to diagnose and locate the link fault. Since the existing access technology is mainly the Digital Subscriber Line (DSL) technology, the Access Node is mainly an independent Digital Subscriber Line Access Multiplexer (DSLAM). After introducing the PON technology into the access network, an originally independent access node has been expanded as a network consisting of the OLT, the ONU and an Optical Distribution Network (ODN).

Therefore, according to the existing Ethernet Passive Optical Network (EPON) described in Standard TR101, IEEE 802.3ah standard provides a simple method (namely, loopback and bit error rate detection) for diagnosing the physical layer fault between the OLT and the ONU, while there is no specific maintenance and administration method at the Ethernet level whose level is higher than the physical layer optical link.

SUMMARY OF THE INVENTION

According to the 4 administration domains and the method for maintaining and administrating defined in the existing standard TR101, in fact, the OLT cannot actively diagnose and locate the fault at the Ethernet level between the OLT and the ONU within the access node through the existing definition, only can passively respond; even if passively responding, the final detection result cannot be acquired to judge whether the link of the Ethernet level between the OLT and the ONU works normally or not.

The purpose of the present invention is to provide a method for administrating optical access node and a kind of optical access node, so as to provide a mechanism for diagnosing a fault at the Ethernet level between the OLT and the ONU inside the optical access node, thus to help the operator to locate the fault at service level inside the access node.

To solve the aforementioned problem, the present invention provides a method for administrating an optical access node, and the method comprises:

establishing one or more administration terminal nodes in the optical access node, so as to form an internal Operation, Administration and Maintenance domain containing the administration terminal nodes; and transmitting the Ethernet Operation, Administration and Maintenance message between the administration terminal nodes, and according to the Virtual Local Area Network attribute of the user, the Operation, Administration and Maintenance message carrying the Virtual Local Area Network identifier corresponding to the Virtual Local Area Network attribute of the user.

The step of establishing one or more administration terminal nodes in the optical access node so as to form an internal Operation, Administration and Maintenance (OAM) domain containing the administration terminal nodes comprises: establishing the $1^{st}$ administration terminal node at the network side interface of the Optical Line Terminal, establishing the $2^{nd}$ administration terminal node at the user side network interface of the Optical Network Unit, so as to form the internal Operation, Administration and Maintenance domain;

the step of transmitting the Ethernet Operation, Administration and Maintenance message between the administration terminal nodes comprises: one of the $1^{st}$ administration terminal node and the $2^{nd}$ administration terminal node is taken as the starting node of the test, the other one as the end node of the test; the starting node of the test transmits the Ethernet Operation, Administration and Maintenance message to the end node of the test; and the end node of the test returns the response to the starting node of the test after receiving the Ethernet Operation, Administration and Maintenance message.

After the step of the starting node of the test transmitting the Ethernet Operation, Administration and Maintenance message to the end node of the test, the method also comprises:

if the starting node of the test receives the response of the Ethernet Operation, Administration and Maintenance message from the end node of the test, it determines that the Ethernet connectivity is normal within the internal Operation, Administration and Maintenance domain; if the starting node of the test dose not receive the response of the Ethernet Operation, Administration and Maintenance message from the end node of the test, it determines that the Ethernet connectivity is abnormal within the internal Operation, Administration and Maintenance domain.

The step of establishing one or more administration terminal nodes in the optical access node to form the internal Operation, Administration and Maintenance domain containing the administration terminal nodes, comprises:

establishing the $1^{st}$ administration terminal node at the network side interface of the Optical Line Terminal, establishing the administration intermediate node at the physical interface of the Optical Line Terminal; and establishing the $2^{nd}$ administration terminal node at the user side network interface of the Optical Network Unit, so as to form the internal Operation, Administration and Maintenance domain;

the step of transmitting the Ethernet Operation, Administration and Maintenance message between the administration terminal nodes comprises: one of the $1^{st}$ administration terminal node and the $2^{nd}$ administration terminal node is taken as the starting node of the test, the other as the end node of the test; the starting node of the test transmits the Ethernet Operation, Administration and Maintenance message to the administration intermediate node; the administration intermediate node returns the response to the starting node of the test after receiving the Ethernet Operation, Administration and Maintenance message, and forwards the Ethernet Operation, Administration and Maintenance message to the end node of the test; the end node of the test returns the response to the starting node of the test after receiving the Ethernet Operation, Administration and Maintenance message.

After the step of the starting node of the test transmitting the Ethernet Operation, Administration and Maintenance message to the administration intermediate node, the method also comprises: if the starting node of the test receives the response from the administration intermediate node but does not receive the response from the end node of the test, the starting node of the test determines that the fault of the Ethernet connectivity within the internal Operation, Administration and Maintenance domain is located between the physical interface of the Optical Line Terminal and the user side network interface of the Optical Network Unit.

When the optical access node is in the multiple-to-one Virtual Local Area Network service environment, the Ethernet Operation, Administration and Maintenance message carries the Virtual Local Area Network identifier of the user side network interface of the Optical Network Unit with the user being in the multiple-to-one Virtual Local Area Network service environment; when the optical access node is in the one-to-one Virtual Local Area Network service environment, the Ethernet Operation, Administration and Maintenance message carries the Virtual Local Area Network identifier of the user side network interface of the Optical Network Unit with the user being in the one-to-one Virtual Local Area Network service environment.

The Ethernet Operation, Administration and Maintenance message also indicates that the type of the Ethernet Operation, Administration and Maintenance message is loopback or Linktrace.

The Ethernet Operation, Administration and Maintenance message also comprises the physical layer address of the node that transmits the Ethernet Operation, Administration and Maintenance message, and the physical layer address of the node that receives the Ethernet Operation, Administration and Maintenance message.

To solve the aforementioned technical problem, the present invention also provides a kind of the optical access node, and the optical access node is set to:

establish one or more administration terminal nodes in the optical access node, and form the internal Operation, Administration and Maintenance (OAM) domain containing the administration terminal nodes; transmit the Ethernet Operation, Administration and Maintenance message between the administration terminal nodes, and according to the Virtual Local Area Network attribute of the user, carry the Virtual Local Area Network identifier corresponding to the Virtual Local Area Network attribute of the user in the Operation, Administration and Maintenance message.

The optical access node is set to establish one or more administration terminal nodes with the following way: establishing the $1^{st}$ administration terminal node at the network side interface of the Optical Line Terminal, establishing the $2^{nd}$ administration terminal node at the user side network interface of the Optical Network Unit, so as to form the internal Operation, Administration and Maintenance domain;

the $1^{st}$ administration terminal node is set to: transmit the Ethernet Operation, Administration and Maintenance message to the $2^{nd}$ administration terminal node; and after receiving the response of the Ethernet Operation, Administration and Maintenance message from the $2^{nd}$ administration terminal node, determine that the Ethernet connectivity is normal within the internal Operation, Administration and Maintenance domain; if not receiving the response of the Ethernet Operation, Administration and Maintenance message from the $2^{nd}$ administration terminal node, determine that the Ethernet connectivity is abnormal within the internal Operation, Administration and Maintenance domain;

the $2^{nd}$ administration terminal node is set to: after receiving the Ethernet Operation, Administration and Maintenance message, return the response to the $1^{st}$ administration terminal node.

The optical access node is set to establish one or more administration terminal node with the following way: establish the $1^{st}$ administration terminal node at the network side interface of the Optical Line Terminal, establish the $2^{nd}$ administration terminal node at the user side network interface of the Optical Network Unit;

the optical access node is also set to: establish the administration intermediate node at the physical interface of the Optical Line Terminal; the $1^{st}$ administration terminal node, the $2^{nd}$ administration terminal node and the administration intermediate node constitute the internal Operation, Administration and Maintenance domain;

the $1^{st}$ administration terminal node is set to: transmit the Ethernet Operation, Administration and Maintenance message to the administration intermediate node; and if receiving the response from the administration intermediate node while not receiving the response from the $2^{nd}$ administration terminal node, determine that the fault of the Ethernet connectivity within the internal Operation, Administration and Maintenance domain is located between the physical interface of the Optical Line Terminal and the user side network interface of the Optical Network Unit;

the administration intermediate node is set to: after receiving the Ethernet Operation, Administration and Maintenance message, return the response to the $1^{st}$ administration terminal node, and forward the Ethernet Operation, Administration and Maintenance message to the $2^{nd}$ administration terminal node;

the $2^{nd}$ administration terminal node is set to: after receiving the Ethernet Operation, Administration and Maintenance message, return the response to the $1^{st}$ administration terminal node.

When the optical access node is in the multiple-to-one Virtual Local Area Network service environment, the Ethernet Operation, Administration and Maintenance message carries the Virtual Local Area Network identifier of the user side network interface of the Optical Network Unit with the user being in the multiple-to-one Virtual Local Area Network service environment; when the optical access node is in the one-to-one Virtual Local Area Network service environment, the Ethernet Operation, Administration and Maintenance message carries the Virtual Local Area Network identifier of the user at the user side network interface of the Optical Network Unit with the user being in the one-to-one Virtual Local Area Network service environment.

The Ethernet Operation, Administration and Maintenance message also indicates that the type of the Ethernet Operation, Administration and Maintenance message is loopback or Linktrace.

The Ethernet Operation, Administration and Maintenance message also comprises the physical layer address of the node that transmits the Ethernet Operation, Administration and Maintenance message, and the physical layer address of the node that receives the Ethernet Operation, Administration and Maintenance message.

The present invention provides a mechanism for diagnosing fault at the Ethernet level between the OLT and the ONU inside the optical access node, and it is able to break through the limitation that the conventional Ethernet OAM frame format is unitary and unfit for the TR101 Virtual Local Area Network (VLAN) service model, moreover, the service operation is not affected when using the method of the present operation, thus to help the operator to address the Ethernet maintenance requirements of the optical access node under the TR101 VLAN structure.

PREFERRED EMBODIMENTS OF THE PRESENT INVENTION

Figure 1:
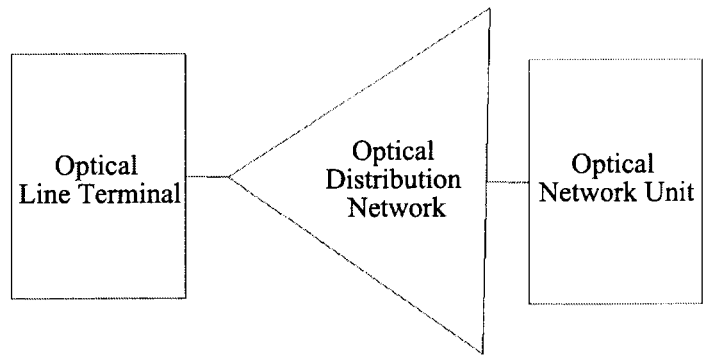
FIG. 1 is a structural diagram of an optical access node in the passive optical network in accordance with an embodiment of the present invention.

As shown in FIG. 1, an optical access node consists of the OLT, the ODN and the ONU.

The optical access node is set to: establish one or more administration terminal nodes in the optical access node, transmit the Ethernet Operation, Administration and Maintenance message between the administration terminal nodes to judge whether the Ethernet connectivity within the internal Operation, Administration and Maintenance domain is normal or not, and according to the Virtual Local Area Network attribute of the user, carry the Virtual Local Area Network identifier corresponding to the Virtual Local Area Network attribute of the user in the Operation, Administration and Maintenance message.

In the case of the first embodiment, the optical access node establishes the $1^{st}$ administration terminal node at the network side interface of the Optical Line Terminal, establishes the $2^{nd}$ administration terminal node at the user side network interface of the Optical Network Unit, so as to form the internal Operation, Administration and Maintenance domain; in the case of the $2^{nd}$ embodiment, besides of the $1^{st}$ admnistration terminal node and the $2^{nd}$ administration terminal node, the optical access node also establishes the administration intermediate node at the physical interface of the Optical Line Terminal, so as to form the internal Operation, Administration and Maintenance domain.

In the case of the first embodiment, the $1^{st}$ administration terminal node transmits the Ethernet Operation, Administration and Maintenance message to the $2^{nd}$ administration terminal node; in the case of the second embodiment, the $1^{st}$ administration terminal node transmits the Ethernet Operation, Administration and Maintenance message to the administration intermediate node; and here when the optical access node is in the multiple-to-one Virtual Local Area Network service environment, the Ethernet Operation, Administration and Maintenance message carries the Virtual Local Area Network identifier of the user network interface of the Optical Network Unit with the user being in the multiple-to-one Virtual Local Area Network service environment; when the optical access node is in the one-to-one Virtual Local Area Network service environment, the Ethernet Operation, Administration and Maintenance message carries the Virtual Local Area Network identifier of the user network interface of the Optical Network Unit with the user being in the one-to-one Virtual Local Area Network service environment. In the case of the first embodiment, after receiving the response of the Ethernet Operation, Administration and Maintenance message from the $2^{nd}$ administration terminal node, it is determined that the Ethernet connectivity is normal within the internal Operation, Administration and Maintenance domain; if not receiving the response of the Ethernet Operation, Administration and Maintenance message from the $2^{nd}$ administration terminal node, it is determined that the Ethernet connectivity is abnormal within the internal Operation, Administration and Maintenance domain. In the case of the second embodiment, if receiving the response from the administration intermediate node while not receiving the response from the $2^{nd}$ administration terminal node, it is determined that the fault of the Ethernet connectivity within the internal Operation, Administration and Maintenance domain is located between the physical interface of the Optical Line Terminal and the user side network interface of the Optical Network Unit.

In the cases of the first and second embodiments, it is to decide the Ethernet connectivity within the internal Operation, Administration and Maintenance domain according to whether receiving the response from the $2^{nd}$ administration terminal node within a certain time period or not, and the setting of this certain time period is decided with different message transferring in the optical node. For the value, there are some recommended values in the standard 802.1ag, but it is not limited to these recommended values, and the setting can be adjusted on the system apparatus according to the practical conditions.

The administration intermediate node, in the case of the $2^{nd}$ embodiment, is set to: after receiving the Ethernet Operation, Administration and Maintenance message, return the response to the $1^{st}$ administration terminal node, and forward the Ethernet Operation, Administration and Maintenance message to the $2^{nd}$ administration terminal node.

The $2^{nd}$ administration terminal node is set to: after receiving the Ethernet Operation, Administration and Maintenance message, return the response to the $1^{st}$ administration terminal node.

Figure 2:
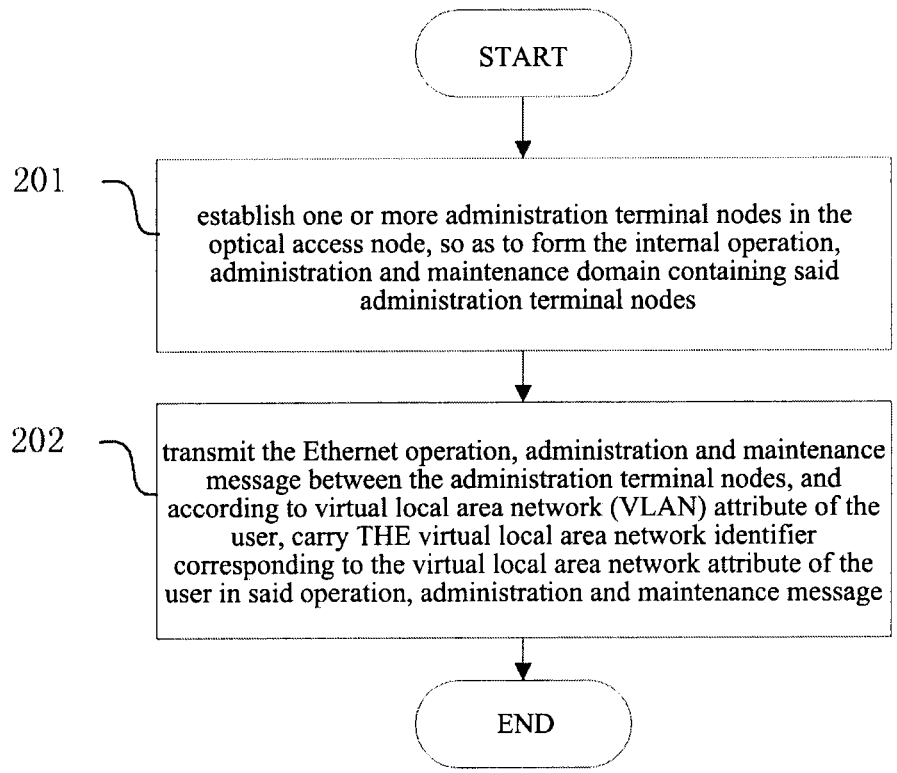
FIG. 2 is a flow chart of a method for administrating the optical access node in the passive optical network in accordance with an embodiment of the present invention.

As shown in FIG. 2, the method for administrating the optical access node in the passive optical network comprises the following steps:

step 201, establishing one or more administration terminal nodes in the optical access node, so as to form the internal Operation, Administration and Maintenance domain containing the administration terminal nodes;

step 202, transmitting the Ethernet Operation, Administration and Maintenance message between the administration terminal nodes, and according to the Virtual Local Area Network attribute of the user, carrying the Virtual Local Area Network identifier corresponding to the Virtual Local Area Network attribute of the user in the Operation, Administration and Maintenance message.

The present invention will be illustrated in further detail in combination with the specific embodiments in the following.

The First Embodiment

Two MEP nodes are established in the first embodiment, and the method for administrating the optical access node in the passive optical network comprises the following steps:

step 11, establishing the MEP1 node at the network interface (namely Northbound Interface) of the OLT, establishing the MEP2 node at the user network interface (namely Southbound Interface) of the Optical Network Unit, and defining the two MEP nodes as the administration nodes at the independent level (that is, the value of the level is different from the one of any other existing level), so as to form an independent internal Operation, Administration and Maintenance domain, named as Intra-AN domain;

step 12, if the OLT needs to detect the Ethernet connectivity within the internal Operation, Administration and Maintenance domain, taking one of the MEP1 node and MEP2 node as the starting node of the test, and the other one as the end node of the test; that is, if the MEP1 node is taken as the starting node of the test to transmit the test message, the MEP2 node is taken as the end node of the test; alternatively, if the MEP2 node is taken as the starting node of the test to transmit the test message, the MEP1 node is taken as the end node of the test;

step 13, the starting node of the test transmitting the Ethernet OAM message to the end node of the test, and the structure of the Ethernet OAM message is shown as Table 1:

TABLE 1 the structure of the Ethernet OAM message

| DA | SA | VID | CFM EtherType | Intra-AN MD level | Message |
| --- | --- | --- | --- | --- | --- | wherein, DA is the MAC address of the interface at which the message is transmitted; (that is, the MAC address of the user network interface of the ONU in the first embodiment);

SA is the MAC address of the destination interface of the message; (that is, the MAC address of the network interface of the OLT in the first embodiment);

VID is the VLAN identifier of the user network interface of the ONU in the VLAN service environment;

Intra-AN MD Level is an independent specific level set by the internal Operation, Administration and Maintenance domain according to the practical condition.

Message is an indicator for identifying the frame operation type, it requests the ONU to perform the corresponding processing, and it might indicate the operation of Loopback or Linktrace.

The aforementioned VID field is the VLAN identifier of the user side network interface of the ONU corresponding to the VLAN attribute of the user in the multiple-to-one (N:1) VLAN service environment (the user identifier) if it is the practical condition of the N:1 VLAN service being performed between the UNI of the ONU and the OLT; the VID field is the VLAN identifier of the user network interface of the ONU corresponding to the VLAN attribute of the user in the one-to-one (1:1) VLAN service environment (the service identifier) if it is the practical condition of the 1:1 VLAN service being performed between the UNI of the ONU and the OLT.

N:1 VLAN indicates that one service identifier (S-VLAN) corresponds to multiple users, and each user has its own user identifier (C-VLAN). 1:1 VLAN indicates that each user has its own S-VLAN identifier. If the OAM frame is identified by the S-VLAN uniformly, the specific ONU user cannot be found correspondingly in the N:1 VLAN application mode. In the aforementioned method, two cases of N:1 VLAN and 1:1 VLAN are distinguished so that the Ethernet OAM message corresponds to each specific user.

Step 14, after receiving the Ethernet Operation, Administration and Maintenance message, the end node of the test returns the response to the starting node of the test;

the structure of the Ethernet OAM response message returned by the end node of the test might be the format in Table 2.

TABLE 2 the structure of the Ethernet OAM response message

| DA | SA | VID | CFM EtherType | Intra-AN MD level | Message Reply |
| --- | --- | --- | --- | --- | --- |

The first four fields in Table 2 are the same as the ones shown in Table 1, the fifth field indicates the message is a response message.

Step 15, if the starting node of the test receives the response of the Ethernet Operation, Administration and Maintenance message from the end node of the test, it is to determine that the Ethernet connectivity is normal within the internal Operation, Administration and Maintenance domain; if the starting node of the test dose not receive the response of the Ethernet Operation, Administration and Maintenance message from the end node of the test, it is to determine that the Ethernet connectivity is abnormal within the internal Operation, Administration and Maintenance domain, other methods can further be used to specifically detect whether the fault is located in the OLT or the ONU.

The Second Embodiment

Two MEP nodes, that is, MEP1 and MEP2, are established in the second embodiment, and one MIP node is established in the two MEP nodes, the method for administrating the optical access node in the passive optical network comprises the following steps:

step 21, establishing the MEP1 node at the network interface of the OLT, and establishing the administration intermediate node at the physical interface of the OLT; establishing the MEP2 node at the user network interface of the Optical Network Unit, and defining the established MEP1, MEP2 and MIP as the administration nodes at an independent level (the value of the independent level is different from the one of any other existing level), so as to form an independent internal Operation, Administration and Maintenance domain, named as Intra-AN domain;

step 22, if the OLT needs to locate the fault of the Ethernet link within the internal Operation, Administration and Maintenance domain, it takes one of the MEP1 node and MEP2 node as the starting node of the test, and the other one as the end node of the test; that is, if the MEP1 node is taken as the starting node of the test to transmit the test message, the MEP2 node is taken as the end node of the test; alternatively, if the MEP2 node is taken as the starting node of the test to transmit the test message, the MEP1 node is taken as the end node of the test;

step 23, the starting node of the test transmitting the Ethernet OAM message to the administration intermediate node, and the structure of the Ethernet OAM message is shown as Table 1, and the meaning of each field in Table 1 is the same as the one in step 13.

Step 24, after receiving the Ethernet Operation, Administration and Maintenance message, the administration intermediate node returns the response to the starting node of the test, and forwards the Ethernet Operation, Administration and Maintenance message to the end node of the test; the end node of the test returns the response to the starting node of the test after receiving the Ethernet Operation, Administration and Maintenance message;

the structure of the Ethernet OAM response message returned by the administration intermediate node and the end node of the test might be the format in Table 2.

Step 25, if the starting node of the test receives the response from the administration intermediate node but does not receive the response from the end node of the test, it determines that the fault of the Ethernet connectivity within the internal Operation, Administration and Maintenance domain is located between the physical interface of the Optical Line Terminal and the user side network interface of the Optical Network Unit rather than inside the OLT, and other methods can further be used to specifically detect whether the fault is located in the ODN or the ONU.

The above description is only the preferred embodiments of the present invention, and is not intended to limit the present invention. For those skilled in the field, the present invention can be modified or improved. All modifications, equivalents and variations, which are made without departing from the spirit and essence of the present invention, should belong to the scope of the present invention.

INDUSTRIAL APPLICABILITY

The present invention provides a mechanism for diagnosing fault at the Ethernet level between the OLT and the ONU inside the optical access node, and it is able to break through the limitation that the conventional Ethernet OAM frame format is unitary and unfit for the TR101 Virtual Local Area Network (VLAN) service model, moreover, the service operation is not affected when using the method of the present operation, thus to help the operator to address the Ethernet maintenance requirements of the optical access node under the TR101 VLAN structure.

What is claimed is:

1. An administration method for an optical access node, comprising:
    establishing one or more administration terminal nodes in an optical access node so as to form an internal Operation, Administration and Maintenance domain containing the administration terminal nodes; and
    transmitting Ethernet Operation, Administration and Maintenance message between the administration terminal nodes, and according to Virtual Local Area Network attribute of a user, the Operation, Administration and Maintenance message carrying a Virtual Local Area Network identifier corresponding to the Virtual Local Area Network attribute of the user;
    wherein:
    the step of establishing one or more administration terminal nodes in the optical access node so as to form an internal Operation, Administration and Maintenance (OAM) domain containing the administration terminal nodes comprises: establishing a $1^{st}$ administration terminal node at a network side interface of an Optical Line Terminal, establishing a $2^{nd}$ administration terminal node at a user side network interface of an Optical Network Unit, so as to form the internal Operation, Administration and Maintenance domain;
    the step of transmitting the Ethernet Operation, Administration and Maintenance message between the administration terminal nodes comprises:
    taking one of the $1^{st}$ administration terminal node and the $2^{nd}$ administration terminal node as a starting node of a test, another one as an end node of the test;
    the starting node of the test transmitting the Ethernet Operation, Administration and Maintenance message to the end node of the test; and
    the end node of the test returning a response to the starting node of the test after receiving the Ethernet Operation, Administration and Maintenance message.

2. The administration method of claim 1, wherein:
    after the step of the starting node of the test transmitting the Ethernet Operation, Administration and Maintenance message to the end node of the test, the method also comprises:
    if the starting node of the test receives the response of the Ethernet Operation, Administration and Maintenance message from the end node of the test, the starting node of the test determining that an Ethernet connectivity is normal within the internal Operation, Administration and Maintenance domain;
    if the starting node of the test does not receive the response of the Ethernet Operation, Administration and Maintenance message from the end node of the test, the starting node of the test determining that the Ethernet connectivity is abnormal within the internal Operation, Administration and Maintenance domain.

3. The administration method of claim 1, wherein:
    when the optical access node is in a multiple-to-one Virtual Local Area Network service environment, the Ethernet Operation, Administration and Maintenance message carries the Virtual Local Area Network identifier of the user side network interface of the Optical Network Unit with the user being in the multiple-to-one Virtual Local Area Network service environment; when the optical access node is in a one-to-one Virtual Local Area Network service environment, the Ethernet Operation, Administration and Maintenance message carries the Virtual Local Area Network identifier of the user side network interface of the Optical Network Unit with the user being in the one-to-one Virtual Local Area Network service environment.

4. The administration method of claim 1, wherein:
    the Ethernet Operation, Administration and Maintenance message also indicates that a type of the Ethernet Operation, Administration and Maintenance message is loopback or Linktrace.

5. The administration method of claim 1, wherein:
    the Ethernet Operation, Administration and Maintenance message also comprises a physical layer address of a node that transmits the Ethernet Operation, Administration and Maintenance message, and a physical layer address of a node that receives the Ethernet Operation, Administration and Maintenance message.

6. The administration method of claim 1, wherein:
    the step of establishing one or more administration terminal nodes in the optical access node to form the internal Operation, Administration and Maintenance domain containing the administration terminal nodes, comprises: establishing a $1^{st}$ administration terminal node at the network side interface of an Optical Line Terminal, establishing an administration intermediate node at a physical interface of an Optical Line Terminal; and establishing a $2^{nd}$ administration terminal node at a user side network interface of an Optical Network Unit, so as to form the internal Operation, Administration and Maintenance domain;
    the step of transmitting the Ethernet Operation, Administration and Maintenance message between the administration terminal nodes comprises: taking one of the $1^{st}$ administration terminal node and the $2^{nd}$ administration terminal node as a starting node of a test, another as an end node of the test;

the starting node of the test transmitting the Ethernet Operation, Administration and Maintenance message to the administration intermediate node;

the administration intermediate node returning a response to the starting node of the test after receiving the Ethernet Operation, Administration and Maintenance message, and forwarding the Ethernet Operation, Administration and Maintenance message to the end node of the test; the end node of the test returning a response to the starting node of the test after receiving the Ethernet Operation, Administration and Maintenance message.

7. The administration method of claim 6, wherein:

after the step of the starting node of the test transmitting the Ethernet Operation, Administration and Maintenance message to the administration intermediate node, the method also comprises:

if the starting node of the test receives the response from the administration intermediate node but does not receive the response from the end node of the test, the starting node of the test determining that a fault of the Ethernet connectivity within the internal Operation, Administration and Maintenance domain is located between the physical interface of the Optical Line Terminal and the user side network interface of the Optical Network Unit.

8. The administration method of claim 6, wherein:

when the optical access node is in a multiple-to-one Virtual Local Area Network service environment, the Ethernet Operation, Administration and Maintenance message carries the Virtual Local Area Network identifier of the user side network interface of the Optical Network Unit with the user being in the multiple-to-one Virtual Local Area Network service environment; when the optical access node is in a one-to-one Virtual Local Area Network service environment, the Ethernet Operation, Administration and Maintenance message carries the Virtual Local Area Network identifier of the user side network interface of the Optical Network Unit with the user being in the one-to-one Virtual Local Area Network service environment.

9. The administration method of claim 6, wherein:

the Ethernet Operation, Administration and Maintenance message also indicates that a type of the Ethernet Operation, Administration and Maintenance message is loopback or Linktrace.

10. The administration method of claim 6, wherein:

the Ethernet Operation, Administration and Maintenance message also comprises a physical layer address of a node that transmits the Ethernet Operation, Administration and Maintenance message, and a physical layer address of a node that receives the Ethernet Operation, Administration and Maintenance message.

11. An optical access node, set to:

establish one or more administration terminal nodes in the optical access node, and form an internal Operation, Administration and Maintenance (OAM) domain containing the administration terminal nodes; transmit Ethernet Operation, Administration and Maintenance message between the administration terminal nodes, and according to Virtual Local Area Network attribute of a user, carry a Virtual Local Area Network identifier corresponding to the Virtual Local Area Network attribute of the user in the Operation, Administration and Maintenance message;

wherein:

the optical access node is set to establish one or more administration terminal nodes by a following way: establishing a $1^{st}$ administration terminal at a network side interface of an Optical Line Terminal, establishing a $2^{nd}$ administration terminal node at a user side network interface of an Optical Network Unit, so as to form the internal Operation, Administration and Maintenance domain;

the $1^{st}$ administration terminal node is set to: transmit the Ethernet Operation, Administration and Maintenance message to the $2^{nd}$ administration terminal node; and after receiving a response of the Ethernet Operation, Administration and Maintenance message from the $2^{nd}$ administration terminal node, determine that an Ethernet connectivity is normal within the internal Operation, Administration and Maintenance domain; if not receiving the response of the Ethernet Operation, Administration and Maintenance message from the $2^{nd}$ administration terminal node, determine that the Ethernet connectivity is abnormal within the internal Operation, Administration and Maintenance domain;

the $2^{nd}$ administration terminal node is set to: after receiving the Ethernet Operation, Administration and Maintenance message, return a response to the $1^{st}$ administration terminal node.

12. The optical access node of claim 11, wherein:

the optical access node is set to establish one or more administration terminal nodes by a following way: establishing a $1^{st}$ administration terminal node at a network side interface of an Optical Line Terminal, establishing a $2^{nd}$ administration terminal node at a user side network interface of an Optical Network Unit; and the optical access node is also set to: establish an administration intermediate node at a physical interface of the Optical Line Terminal; the $1^{st}$ administration terminal node, the $2^{nd}$ administration terminal node and the administration intermediate node constitute the internal Operation, Administration and Maintenance domain;

the $1^{st}$ administration terminal node is set to: transmit the Ethernet Operation, Administration and Maintenance message to the administration intermediate node; and if receiving a response from the administration intermediate node while not receiving a response from the $2^{nd}$ administration terminal node, determine that a fault of the Ethernet connectivity within the internal Operation, Administration and Maintenance domain is located between the physical interface of the Optical Line Terminal and the user side network interface of the Optical Network Unit;

the administration intermediate node is set to: after receiving the Ethernet Operation, Administration and Maintenance message, return a response to the $1^{st}$ administration terminal node, and forward the Ethernet Operation, Administration and Maintenance message to the $2^{nd}$ administration terminal node;

the $2^{nd}$ administration terminal node is set to: after receiving the Ethernet Operation, Administration and Maintenance message, return a response to the $1^{st}$ administration terminal node.

13. The optical access node of claim 12, wherein:

when the optical access node is in a multiple-to-one Virtual Local Area Network service environment, the Ethernet Operation, Administration and Maintenance message carries the Virtual Local Area Network identifier of the user side network interface of the Optical Network Unit with the user being in the multiple-to-one Virtual Local Area Network service environment; when the optical access node is in a one-to-one Virtual Local Area Network service environment, the Ethernet Operation, Administration and Maintenance message carries the Virtual Local Area Network identifier of the user side network interface of the Optical Network Unit with the user being in the one-to-one Virtual Local Area Network service environment.

14. The optical access node of claim 12, wherein:
the Ethernet Operation, Administration and Maintenance message also indicates that a type of the Ethernet Operation, Administration and Maintenance message is loopback or Linktrace.

15. The optical access node of claim 12, wherein:
the Ethernet Operation, Administration and Maintenance message also comprises a physical layer address of a node that transmits the Ethernet Operation, Administration and Maintenance message, and a physical layer address of a node that receives the Ethernet Operation, Administration and Maintenance message.

16. The optical access node of claim 11, wherein:
when the optical access node is in a multiple-to-one Virtual Local Area Network service environment, the Ethernet Operation, Administration and Maintenance message carries the Virtual Local Area Network identifier of the user side network interface of the Optical Network Unit with the user being in the multiple-to-one Virtual Local Area Network service environment; when the optical access node is in a one-to-one Virtual Local Area Network service environment, the Ethernet Operation, Administration and Maintenance message carries the Virtual Local Area Network identifier of the user side network interface of the Optical Network Unit with the user being in the one-to-one Virtual Local Area Network service environment.

17. The optical access node of claim 11, wherein:
the Ethernet Operation, Administration and Maintenance message also indicates that a type of the Ethernet Operation, Administration and Maintenance message is loopback or Linktrace.

18. The optical access node of claim 11, wherein:
the Ethernet Operation, Administration and Maintenance message also comprises a physical layer address of a node that transmits the Ethernet Operation, Administration and Maintenance message, and a physical layer address of a node that receives the Ethernet Operation, Administration and Maintenance message.

* * * * *